(12) United States Patent
Saito et al.

(10) Patent No.: US 11,052,649 B2
(45) Date of Patent: Jul. 6, 2021

(54) RESIN POWDER FOR SOLID FREEFORM FABRICATION, DEVICE FOR FABRICATING SOLID FREEFORM FABRICATION OBJECT, AND RESIN POWDER

(71) Applicants: Akira Saito, Kanagawa (JP); Shigenori Yaguchi, Tokyo (JP); Yasuo Suzuki, Shizuoka (JP); Nozomu Tamoto, Shizuoka (JP); Shinzo Higuchi, Tokyo (JP); Hitoshi Iwatsuki, Kanagawa (JP)

(72) Inventors: Akira Saito, Kanagawa (JP); Shigenori Yaguchi, Tokyo (JP); Yasuo Suzuki, Shizuoka (JP); Nozomu Tamoto, Shizuoka (JP); Shinzo Higuchi, Tokyo (JP); Hitoshi Iwatsuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 16/007,064

(22) Filed: Jun. 13, 2018

(65) Prior Publication Data
US 2018/0355144 A1 Dec. 13, 2018

(30) Foreign Application Priority Data

Jun. 13, 2017 (JP) .............................. JP2017-115887
May 15, 2018 (JP) .............................. JP2018-093441

(51) Int. Cl.
*B33Y 70/00* (2020.01)
*C08K 5/52* (2006.01)
*C08K 5/09* (2006.01)
*C08K 5/1575* (2006.01)
*C08K 5/372* (2006.01)
*C08K 5/521* (2006.01)
*B29C 64/153* (2017.01)
*C08L 71/00* (2006.01)
*C08L 77/06* (2006.01)
*C08L 59/00* (2006.01)
*B33Y 10/00* (2015.01)
*C08L 77/02* (2006.01)
(Continued)

(52) U.S. Cl.
CPC .......... *B33Y 70/00* (2014.12); *B29C 64/153* (2017.08); *B33Y 10/00* (2014.12); *C08K 5/005* (2013.01); *C08K 5/09* (2013.01); *C08K 5/1575* (2013.01); *C08K 5/372* (2013.01); *C08K 5/52* (2013.01); *C08K 5/521* (2013.01); *C08L 59/00* (2013.01); *C08L 71/00* (2013.01); *C08L 77/02* (2013.01); *C08L 77/06* (2013.01); *B29K 2023/12* (2013.01); *B29K 2067/006* (2013.01); *B29K 2071/00* (2013.01); *B29K 2071/02* (2013.01); *B29K 2077/00* (2013.01); *B29K 2105/0017* (2013.01); *B29K 2105/0094* (2013.01); *B29K 2105/251* (2013.01); *B29K 2995/0077* (2013.01); *B29K 2995/0094* (2013.01); *B29K 2995/0098* (2013.01); *B33Y 30/00* (2014.12); *C08K 5/098* (2013.01); *C08K 5/13* (2013.01); *C08K 5/36* (2013.01); *C08K 5/49* (2013.01); *C08L 23/12* (2013.01)

(58) Field of Classification Search
CPC .......... C08L 77/06; C08L 77/02; C08L 71/00; C08L 59/00; C08L 23/12; C08K 5/521; C08K 5/52; C08K 5/372; C08K 5/49; C08K 5/36; C08K 5/1575; C08K 5/13; C08K 5/098; C08K 5/09; C08K 5/055; B33Y 70/00; B33Y 30/00; B33Y 10/00; B29K 2995/0098; B29K 2995/0094; B29K 2995/0077; B29K 2105/251; B29K 2105/0094; B29K 2105/0017; B29K 2077/00; B29K 2071/02; B29K 2071/00; B29K 2067/006; B29K 2023/12; B29C 2071/022; B29C 64/153; B29B 2009/125; B29B 9/16; B29B 9/12
See application file for complete search history.

(56) References Cited

U.S. PATENT DOCUMENTS

| | | |
|---|---|---|
| 6,531,086 B1 | 3/2003 | Larsson |
| 2011/0052927 A1 | 3/2011 | Martinoni et al. |

(Continued)

FOREIGN PATENT DOCUMENTS

| | | |
|---|---|---|
| JP | 2010-189610 A | 9/2010 |
| WO | WO2004/003823 A1 | 1/2004 |

(Continued)

OTHER PUBLICATIONS

Product Description UBESTA 3024U (polyamide-12) from Dongguan Shuangbang Plastic Materials Co. obtained online on Aug. 31, 2020. Retrieved from URL:<http://www.pomm90.com/news/dongtai/2431.html> (Year: 2020).*

(Continued)

Primary Examiner — Sanza L. McClendon
(74) Attorney, Agent, or Firm — Oblon, McClelland, Maier & Neustadt, L.L.P.

(57) ABSTRACT

A resin powder for solid freeform fabrication, having a melting point of 100 degrees C. or higher as measured according to ISO 3146 regulation and a ratio of melt mass-flow rate B to melt mass-flow rate A of greater than 0.80 to 1.20, wherein the melt mass-flow rate A and the melt mass-flow rate B are respectively measured at 15 degrees C. higher than the melting point under a load of 2.16 kg according to JIS K7210 format before and after the resin powder is maintained at a temperature 15 degrees C. lower than the melting point under a pressure of 0.1 kPa for four hours.

20 Claims, 5 Drawing Sheets

(51) Int. Cl.
*C08K 5/00* (2006.01)
*B29K 71/00* (2006.01)
*B29K 105/00* (2006.01)
*B29K 77/00* (2006.01)
*B29K 67/00* (2006.01)
*B33Y 30/00* (2015.01)
*B29K 23/00* (2006.01)
*C08L 23/12* (2006.01)
*C08K 5/36* (2006.01)
*C08K 5/49* (2006.01)
*C08K 5/098* (2006.01)
*C08K 5/13* (2006.01)

(56) References Cited

U.S. PATENT DOCUMENTS

| | | | |
|---|---|---|---|
| 2016/0271877 A1 | 9/2016 | Suzuki et al. | |
| 2016/0271879 A1 | 9/2016 | Yamashita et al. | |
| 2017/0190905 A1* | 7/2017 | Arai | B29C 64/393 |
| 2017/0217087 A1 | 8/2017 | Tamoto et al. | |
| 2017/0225404 A1 | 8/2017 | Naruse et al. | |
| 2018/0001520 A1 | 1/2018 | Saito et al. | |
| 2018/0022024 A1* | 1/2018 | Saito | B29B 9/16 |
| | | | 264/482 |
| 2018/0023219 A1 | 1/2018 | Saito et al. | |
| 2018/0147780 A1 | 5/2018 | Kamoda et al. | |

FOREIGN PATENT DOCUMENTS

| | | |
|---|---|---|
| WO | WO2006/020279 A2 | 2/2006 |
| WO | WO2008/057844 A1 | 5/2008 |
| WO | WO2015/159834 A1 | 10/2015 |
| WO | WO 2016/121013 A1 | 8/2016 |

OTHER PUBLICATIONS

Extended European Search Report dated Nov. 15, 2018 in Patent Application No. 18177256.7, 18 pages.
Martinez, A. et al. "Comparison of aged polyamide powders for selective laser sintering" AIP Conference Proceedings, XP055519904, Apr. 30, 2012, pp. 5-13 and Cover Page.
U.S. Appl. No. 15/917,993, filed Mar. 12, 2018, Nozomu Tamoto, et al.
U.S. Appl. No. 15/919,251, filed Mar. 13, 2018, Sohichiroh Iida, et al.

* cited by examiner

RESIN POWDER FOR SOLID FREEFORM FABRICATION, DEVICE FOR FABRICATING SOLID FREEFORM FABRICATION OBJECT, AND RESIN POWDER

CROSS-REFERENCE TO RELATED APPLICATIONS

This patent application is based on and claims priority pursuant to 35 U.S.C. § 119 to Japanese Patent Application Nos. 2017-115887 and 2018-093441, filed on Jun. 13, 2017 and May 15, 2018, respectively, in the Japan Patent Office, the entire disclosures of which are hereby incorporated by reference herein.

BACKGROUND

Technical Field

The present invention relates to a resin powder for solid freeform fabrication, a device for fabricating a solid freeform fabrication object, and a resin powder.

Description of the Related Art

A method of manufacturing a solid object of a prototype or a final product is known which includes selectively melting and sintering resin powder. For example, in powder bed fusion (PBF) methods, a thin layer of resin powder is irradiated with laser beams to selectively melt and sinter the resin powder to obtain a layer, which is repeated to laminate layers for fabrication. The PBF method includes selective laser sintering (SLS) methods in which resin powder is selectively irradiated with laser beams for fabrication, selective mask sintering methods in which partially masked resin powder is irradiated with laser beams in planar manner, etc. Also, as an application of the PBF method, multi jet fusion (MJF) methods are known in which liquid containing a heat absorbent is dripped to resin powder and thereafter the resin powder is irradiated with infrared rays to selectively melt the resin powder.

For fabrication with resin powder, for example, the resin powder prepared to be at a temperature around the softening point thereof is used to maintain inner stress low and relax the inner stress between fabrication layers. Due to irradiation of laser beams on the resin powder prepared to have a temperature around the softening point, the resin powder is heated to temperatures not lower than the softening point and melted.

SUMMARY

According to the present invention, provided is an improved resin powder for solid freeform fabrication, having a melting point of 100 degrees C. or higher as measured according to ISO 3146 regulation and a ratio of melt mass-flow rate B to melt mass-flow rate A of greater than 0.80 to 1.20, wherein the melt mass-flow rate A and the melt mass-flow rate B are respectively measured at 15 degrees C. higher than the melting point under a load of 2.16 kg according to JIS K7210 format before and after the resin powder is maintained at a temperature 15 degrees C. lower than the melting point under a pressure of 0.1 kPa for four hours.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

As the resin powder, for example, a semi-aromatic polyamide resin composition for use in fused deposition modeling (FDM) utilizing laser irradiation has been proposed.

In the method of selectively melting resin powder for solid freeform fabrication to fabricate an object, the resin powder for solid freeform fabrication not melted in the fabrication process is recycled in some occasions.

However, the use of such recycled solid freeform fabrication resin powder for fabrication causes surface deficiency referred to as orange peel such as coarse surface, voids, and distortion or degradation of tensile strength of an obtained fabrication object.

Embodiments of the present disclosure are described in detail below, but the present disclosure is not limited thereto.

Resin Powder for Solid Freeform Fabrication

The resin powder for solid freeform fabrication according to an embodiment of the present disclosure has a melting point of 100 degrees C. or higher as measured according to ISO 3146 regulation and a ratio of melt mass-flow rate A to melt mass-flow rate B of greater than 0.80 to 1.20. The melt mass-flow rate A and the melt mass-flow rate B are respectively measured at 15 degrees C. higher than the melting point under a load of 2.16 kg according to JIS K7210 format before and after the resin powder is maintained at a temperature 15 degrees C. lower than the melting point under a pressure of 0.1 kPa for four hours. The resin powder for solid freeform fabrication is simply referred to as resin powder.

The melting point of the resin powder is determined according to differential scanning calorimetry (DSC). In this case, according to ISO 3146 regulation (plastic transfer temperature measuring method, JIS K7121 format), for example, using a differential scanning calorimeter (DSC-60A, manufactured by Shimadzu Corporation), resin powder is heated at a temperature rising rate of 10 degrees C./min. and subject to DSC measuring. The temperature of the obtained endothermic peak or the melting point peak is determined as the melting point. In the case of resin powder having multiple melting points, the melting point is the melting point on the higher temperature side in embodiments of the present disclosure.

The melting point of the resin powder is 100 degrees C. or higher, preferably 150 degrees C. or higher, and more preferably 200 degrees C. or higher taking into account heatproof temperature for fabrication of exterior of a product.

The resin powder is heated at a temperature 15 degrees C. lower than the melting point under a pressure of 0.1 kPa. A specific example of a device capable of setting a reduced pressure is DP610 vacuum heater (manufactured by Yamato Scientific Co., Ltd.) in the present disclosure. The resin powder relating to an embodiment of the present disclosure is subject to measuring of melt mass-flow rate A before heating (temperature maintenance) by this vacuum heater and melt mass-flow rate B after heating for comparison. Relation 1 Ratio (B/A) (=ratio obtained by dividing melt mass-flow rate after heating by melt mass-flow rate before heating) Relation 1

Melt mass-flow rate (MFR) is an amount of a resin extruded from the opening (nozzle) disposed on the base of a container per 10 minutes when a predetermined amount of resin powder is heated at a particular temperature and thereafter pressurized. MFR is measured at a temperature 15 degrees C. higher than the melting point under a load of 2.16 kg using, for example, a melt mass-flow rate measuring device (Type D405913, manufactured by Dynisco, LLC.) according to JIS K7210 format (ISO 1133 regulation).

According to JIS K7210 format, MFR of a resin measured at a temperature 15 degrees C. higher than the melting point under a load of 2.16 kg is preferably from 0.5 to 50 g/10 minutes in terms of fabrication utilizing laser beams, more preferably from 1.0 to 40 g/10 minutes in terms of reducing occurrence of orange peels, and furthermore preferably from 1.5 to 30 g/10 minutes in terms of strength of a fabrication object.

In addition, the ratio obtained by dividing the MFR (B) after heating by the MFR (A) before heating is greater than 0.80 to 1.20 When the ratio of dividing the MFR (B) after heating with the MFR (A) before heating is outside this range. roughness of the surface of resin worsens, which increases frequency of defective fabrication and is therefore outside the scope of the present disclosure. In addition, the ratio of dividing the MFR (B) after heating by MFR (A) before heating is preferably greater than 0.90 to 1.10 in terms of stability.

The resin powder produces radicals when heated to temperatures close to the melting point, the produced radicals cause cross-linking and/or decomposition of molecules. The present inventors have confirmed that surface deficiency occurs or strength deteriorates for fabrication with such resin powder having an MFR changed due to cross-linking or decomposition. Therefore, the present inventors have repeated evaluation of fabrication objects obtained by resin powders having various melting properties and have found that the resin powder having the melting properties mentioned above is free of surface deficiency or deterioration of strength of a fabrication object regardless of fresh or recycled resin powder. That is, when measuring melt mass-flow rate of resin powder under a load of 2.16 kg and at the temperature 15 degrees C. higher than the melting point of the resin powder according to JIS K7210 format before and after the resin powder is maintained at a temperature 15 degrees C. lower than the melting point for four hours under a load of 0.1 kPa and if the ratio obtained by dividing the melt mass-flow rate after the four hours by the melt mass-flow rate before the four hours is greater than 0.8 to 1.2, preferably from 0.85 to 1.15, and more preferably from 0.90 to 1.10, it is possible to prevent occurrence of surface deficiency or deterioration of strength of a fabrication object.

The resin powder mentioned above contains a thermoplastic resin and an optional additional component added in or on the thermoplastic resin. Each component of the resin powder is described below.

Resin Powder

The resin powder contains a thermoplastic resin as the resin component. The thermoplastic resin is plasticized and melted upon application of heat. The thermoplastic resin includes a crystalline resin or a non-crystalline resin. The crystalline resin has a melting peak detected in the measuring according to ISO3146 regulation (plastic transfer temperature measuring method, JIS K7121 format).

Examples of the resin component in the resin powder include, but are not limited to, polyolefin, polyamide, polyester, polyether, polyphenylene sulfide, liquid crystal polymer (LCP), polyacetal (POM: polyoxymethylene, melting point of 175 degrees C.), polyimide, and fluorochemical resins. These can be used alone or in combination.

Specific examples of the polyolefin include, but are not limited to, polyethylene and polypropylene (PP, melting point of 180 degrees C.).

Specific examples of the polyamide include, but are not limited to, polyamide 410 (PA410), polyamide 6 (PA6), polyamide 66 (PA66, melting point: 265 degrees C.), polyamide 610 (PA610), polyamide 612 (PA612), polyamide 11 (PA11), polyamide 12 (PA12), and semi-aromatic polyamides such as polyamide 4T (PA4T), polyamide MXD6 (PAMXD6), polyamide 6T (PA6T), polyamide 9T (PA9T, melting point of 300 degrees C.), and polyamide 10T (PA10T). PA9T is also referred to as polynonamethylene terephthal amide constituted of a diamine having 9 carbon atoms and a terephthalic acid monomer. Carbon acid side is an aromatic series, which means PA9T is semi-aromatic series. Moreover, as a whole aromatic series in which both carboxylic acid side and diamine side are aromatic, aramid produced from p-phenylenediamine and a terephathalic acid monomer is also included as polyamides.

Specific examples of the polyester include, but are not limited to, polyethyleneterephthalate (PET, melting point of 260 degrees C.), polybutadiens terephthalate (PBT, melting point of 218 degrees C.), and polylactic acid (PLA). To impart heat-proof property, polyester including aromatic series partially including terephthalic acid and isophthalic acid is also suitably used in the present disclosure.

Specific examples of the polyether include, but are not limited to, polyaryl ketones such as polyether ether ketone (PEEK, melting point of 343 degrees C.), polyetherketone (PEK), polyether ketone ketone (PEKK), polyaryl ether ketone (PAEK), polyether ether ketone ketone (PEEKK), and polyether ketone ether ketone ketone (PEKEKK). In addition, as the resin component, it is possible to use polyether sulfone.

The thermoplastic resin may have, for example, two melting point peaks like PA9T. The thermoplastic having two melting peaks completely melts when the temperature thereof reaches temperatures equal to or higher than the melting peak on the higher temperature side. The resin powder preferably contains at least one kind of thermoplastic resin having a melting pint of 100 degrees C. or higher.

To prevent a fabrication object from warping, the temperature width (temperature window) about the crystal layer change, that is, the difference between the melting start temperature and the recystallization point is preferably greater than 3 degrees C. More preferably, the difference is 5 degrees C. or higher to form a finer fabrication object. In addition, due to selection of a resin having a decomposition temperature higher than the heating temperature by laser beams and other components, it is possible to reduce fume ascribable to irradiation of laser beams.

Other Components

The other components in the resin powder include, but are not limited to, an anti-degradation agent, a fluidizer, a toughening agent, a flame retardant, a plasticizer, additives such as a crystal nucleating agent, and non-crystalline resins. The other component can be mixed with a particle or used to cover the surface of the particle. The other component can be used alone or in combination to be added to the resin powder.

Anti-Degradation Agent

To maintain heat stability of molecules and reduce resin degradation such as cross-linking and decomposition, the resin powder may contain an anti-degradation agent.

Examples are metal chelate material, ultraviolet absorbents, polymerization inhibitors, and antioxidants.

Examples of the metal chelate are hydrazide-based, phosphate-based, and phosphite-based compounds. Examples of the ultraviolet absorber are triadine-based compounds. An example of the polymerization inhibitor is copper acetate. Examples of the antioxidant are hindered phenol-based, phosphorus-containing, and sulfur-containing compounds.

As the hindered-phenol-based antioxidant, various additives such as radical scavengers can be used. Specific examples of the hindered phenol-based antioxidant include, but are not limited to, α-tocopherol, butylhydroxytoluene, sinapyl alcohol, vitamin E, octadecyl-3-(3,5-di-tert-butyl-4-hydroxyphenyl)proionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethylester, 2,2'-methylenebis(4-methyl-6-tert-butylphenol), 2,2'-methylenebis(4-ethyl-6-tert-butylphenol), 4,4'-methylenebis (2,6-di-tert-butylphenol), 2,2'methylenebis(4-methyl-6-cyclohexylphenol), 2,2'-dimethylene-bis(6-α-methyl-benzyl-p-cresol, 2,2'-ethylidene-bis(4,6-di-tert-butylphenol), 2,2'butylidene-bis(4-methyl-6-tert-butylphenol), 4,4'butylidenebis(3-methyl-6-tert-butylphenol), triethyleneglycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl6-(3-tert-butyl-5-methyl-2-hydroxybenzyl) phenyl]terephtharate, 3,9-bis{2-[3-(3-tert-butyl-4-hydroxy-5-methyhlphenyl)propionyloxyl-1,1,-dimethylethyl}-2,4,8, 10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hyfroxybenzyl)sulfide, 4,4'-di-thiobis(2,6-di-tert-butylphenol), 4,4(-tri-thiobis(2,6-di-tert-butylphenol), 2,2-thiodiethylenebis-[3-(3,5-di-tert-butyl-4-hydroxyphenyl) propionate], 2,4-bis(n-octylthio-6-(4-hydroxy-3,5-di-tert-butylanilino)-1,3,5-triadine, N,N'-hexamethylenebis-(3,5-di-tert-butyl-4-hydroxyhydrocinnamide), N,N'-bis[3-(3,5-di-tert-butyl-4-hydroxyphenyl)propionyl]hydradine, 1,1,3-tris(2-methyl-4-hydroxy-5-tert-butyhlphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanulate, tris(3,5-di-tert-butyl-4-hydroxybenzyl) isocyanulate, 1,3,5-tris(4-tert-butyl-3-hydroxy-2,6-dimethylbenzylisocyanulate, 1,3,5-tris2[3(3,5-di-tert-butyl-4-hydroxyphenyl)propionyloxy]ethylisocyanulate, tetrakis [methylene-3-(3,5-di-tert-butyl-4-hydroxyphenyl) propionate]methane, triethylene glycol-N-bis-3-(3-tert-butyl-4-hydroxy-5-methyhlphenyl)propipnate, triethyleneglycol-N-bis-3-(3-tert-butyl-4-hydroxy-5-methylphenyl)propionate, triethyleneglycol-N-bis-3-(3-tert-butyl-4-hydroxy-5-methylphenyl)acetate, 3,9-bis[2-{3-(3-tert-butyl-4-hydroxy-5-methyhlphenyl)acetyloxy}-1,1-dimethylethyl]-2,4,8,10-tetraoxaspiro [5,5]undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzylbenzene, and tris(3-tert-butyl-4-hydroxy-5-methylbenzyl)isocyanulate.

Of these hindered phenol-based antioxidants, tetrakis [methyhlenen-3-(3-tert-butyl-4-hydroxy-5-methylphenyl) propionate]methane, octadscyl-3-(3,5-di-tert-butyl-4-hydroxyphenyl)ropionate, 3,9-bis[2-{3-(3-tert-butyl-4-hydroxy-5-methyhlphenyl)acetyloxy}-1,1-dimethylethyl]-2,4,8,10-tetraoxaspiro[5,5]undecane, and tetrakis [methylene-3-(3,5-di-t-butyl-4'-hydroxyphenyl)propionate] methane are preferable in terms of high temperature stability. 3,9-bis[2-{3-(3-t-butyl-4-hydroxy-5-methyhlphenyl)propionyloxy}-1,1-dimethylethyl]-2,4,8,10-tetraoxaspiro[5,5]undecane and tetrakis[methylene-3-(3',5'-di-t-butyl-4'-hydroxyphenyl)propionate]methane are more preferable. These hindered phenol-based antioxidants can be used alone or in combination.

Specific examples of the phosphorus-containing antioxidant include, but are not limited to, phosphorous acid, phosphoric acid, phosphonous acid, phosphonic acid, esters of phosphite compounds, phosphate compounds, phosphonite compounds, phosphonate compounds, and tertiary phosphine. These phosphorus-containing anti-degradation agents can be used alone or in combination.

Specific examples of the phosphite compounds include, but are not limited to, triphenylphosphite, tris(nonylphenyl) phosphite, tridecylphosphite, trioctylphosphite, trioctadecylphosphite, didecylmonophenylphosphite, dioctylmonophenylphosphite, diisopropylemonophenyl phosphite, monobutyldiphesnyl phosphite, monodecyldiphenyl phosphite, monooctyldiphenyiphosphite, tris(diethylphenyl) phosphite, tris(di-iso-propylphenyl)phosphite, tris(di-n-butylphenyl)phosphite, tris(2,4-di-tert-butylphenyl) phosphite, tris(2,6-di-tert-butylphenyl) phosphite, distearllypentaerythritol diphosphite, bis(2,4-ditert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenylbisphenol A pentaerythritol diphosphite, bis(nonylphenyl)pentaerythritol diphosphite, and dicyclohexyl pentaerythritol diphosphite.

Of these phosphite compounds, distearllypentaerythritol diphosphite, bis(2,4-ditert-butylphenyl)pentaerythritol diphosphite, bis(2,6-di-tert-butyl-4-methylphenyl)pentaerythritol diphosphite, and bis{2,4-bis(1-methyl-1-phenylethyl)phenyl}pentaerythritol diphosphite are preferable in terms of high temperature stability.

These phosphite compounds are also available on the market. Specific examples of distearllypentaerythritol diphosphite available on the market include, but are not limited to, ADK STAB PEP-8™, manufactured by ADEKA CORPORATION and JPP681S™, manufactured by JOHOKU CHEMICAL CO., LTD. Specific examples of bis(2,4-di-tert-butylphenyl)pentaerythritol diphosphite available on the market include, but are not limited to, ADK STAB PEP-24G™, manufactured by ADEKA CORPORATION, Alkanox P24™, manufactured by GREAT LAKES CHEMICAL CORPORATION, Ultranox P626 manufactured by GE Specialty Chemicals, Doverphos S-9432™, manufactured by Dover Chemicals, and Irgaofos 126 and 126FF (manufactured by CIBA SPECIALTY CHEMICALS). A specific example of bis(2,6-di-tert-butyl-4-methylphenyl)pentaerythritol diphosphite available on the market include, but are not limited to, ADK STAB PEP-36, manufactured by ADEKA CORPORATION).

Specific examples of bis{2,4-bis(1-methylphenyl-1-phenylethyl)phenyl}pentaerythritol diphosphite available on the market include, but are not limited to, ADK STAB PEP-45, manufactured by ADEKA CORPORATION) and Doverphos S9228™, manufactured by Dover Chemical.

Specific examples the other phosphite compounds include, but are not limited to, compounds having cyclic structures reactive with diphenols.

Specific examples of the compounds having cyclic structures reactive with diphenols include, 2,2'-methylenebis(4,6-di-tert-butylphenyl)(2,4-di-tert-butylphsenyl)phosphite, 2,2'-methylenenbis(4,6-di-tert-butylphenyl)(2-tert-butyl-4-butylphenyl)octylphosphite. and 2,2-methylenebis(4,6-di-tert-butylphenyl)octylphosphite.

Specific examples of the phosphate compounds include, but are not limited to, tributylphosphate, trimethyhlphosphate, tricresyl phosphate, triphenylphosphate, trichlorophenylphosphate, triethylphosphate, diphenylcresyl phosphate, diphenylmonoorthoxenyl phosphate, tributhoxyethylphosphate, dibutylphosphate, dioctylphosphate, octadecyl phosphate, and diisopropyl phosphate. Of these phosphate compounds, triphenyl phosphate, octadecyl phosphate, and tirmethylphosphate are preferable in terms of high temperature stability.

Specific examples of phosphonite compounds include, but are not limited to, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenylphosphonite, bis(2,4-di-tert-butylphenyl)-3-phenyl-phenylphosphonite, bis(2,6-di-n-butylphenyl)-3-phenyl-phenylphosphonite, bis(2,6-di-tert-butylphenyl)-4-phenyl-phenylphosphonite, and bis(2,6-di-tert-butylphenyl)-3-phenyl-phenylphosphonite.

Of these phosphonite compounds, tetrakis(di-tert-butylphenyl)-biphenylene diphosphonite, bis(di-tert-butylphenyl)-phenyl-phenylphosphonite, tetrakis(2,4-di-tert-butylphenyl)-biphenylene diphosphonite, and bis(2,4-di-tert-butylphenyl)-phenyl-phenylphosphonite are preferable in terms of a combinational use with a phosphonite compound.

Specific examples of the phosphonate compounds include, but are not limited to, benzene phosphonic acid dimethyl, benzene phosphonic acid diethyl, and benzene phosphonic acid dipropyl.

Specific examples of the tertiary phosphine include, but are not limited to, triethylene phosphine, tripropyl phosphine, tributyl phosphine, trioctyl phosphine, triamyl phosphine, dimethylphenyl phosphine, dibutylpheyl phosphine, diphenylmethyl phosphine, diphenyloctyl phosphine, triphenyl phosphine, tri-p-tolyl phosphine, trinaphtyl phosphine, and dimethylbanzyl phosphine. Of these tertiary phosphine, triphenyl phosphine is preferable in terms of high temperature stability for a long period of time.

In the case of a combinational use of two or more kinds of anti-degradation agents, there are more effective combinations. For example, for a combinational use of hindered phenol as anti-degradation agent and a phosphorus-containing antioxidant, both complementarily enhance stability, thereby improving thermal stability for a long period of time.

The proportion of anti-degradation agent is preferably from 0.01 to 10 percent by mass, more preferably from 0.05 to 5 percent by mass, and furthermore preferably from 0.1 to 5 percent by mass to the total amount of the resin powder in terms of prevention of degradation for a long period of time. The preferable range of the amount of each anti-degradation agent in the combinational use of two or more kinds of anti-degradation agents is the same as above. When the amount is within the above-mentioned range, degradation of a resin ascribable to heat can be sufficiently prevented, and properties of a fabrication object ameliorate when resin powder used for fabrication is recycled, thereby preventing a change of color caused by the heat of the resin powder.

Fluidizer

There is no specific limit to the fluidizer. For example, spherical particles made of inorganic material are suitable. The volume average particle diameter of the spherical particles made of inorganic material has no particular limit. For example, less than 10 μm is preferable. The proportion of the fluidizer is sufficient if it covers the surface of particles and preferably from 0.1 to 10 percent by mass to the total amount of resin powder.

Specific examples of the inorganic material in spherical particles include, but are not limited to, silica, alumina, titania, zinc oxide, magnesium oxide, tin oxide, iron oxide, copper oxide, hydrated silica, silica the surface of which is modified by a silane coupling agent, and magnesium silicate. Of these, in terms of improvement on fluidity, silica, titania, hydrated silica, and silica the surface of which is modified by a silane coupling agent are preferable. In terms of cost, silica the surface of which is modified hydrophobic by a silane coupling agent is preferable.

Toughening Agent

As the toughening agent, to enhance strength, fiber fillers, beads fillers, glass fillers, glass beads, carbon fiber, and aluminum balls disclosed in WO2008/057844 are suitable. The toughening agent can be used alone or in combination.

The fiber filler has no particular limit. For example, carbon fiber, inorganic fiber, and metal fiber are suitable. The bead filler has no particular limit. For example, carbon beads, inorganic glass beads, and metal fiber beads are suitable.

Heat conductivity of fiber fillers or bead fillers are higher than that of resin powder. Therefore, when the surface of resin powder is irradiated with laser beams in SLS fabrication, heat at the irradiated portion diffuses to the outside of the laser irradiated portion. Therefore, when fiber fillers or bead fillers are mixed with resin powder having no sharp melt property, the resin powder outside of the laser irradiated portion is heated by heat diffusion and excessively melted, which leads to deterioration of fabrication accuracy. However, when fiber fillers or bead fillers are mixed with resin powder containing crystalline thermoplastic resin and having sharp melt property, the resin powder outside of the laser irradiated portion is not easily melted by the heat diffusion, so that high fabrication accuracy can be maintained.

The fiber filler preferably has an average fiber diameter of from 1 to 30 μm and an average fiber length of from 30 to 500 μm. Using a fiber filler having an average fiber diameter and an average fiber length in such ranges, strength of a fabrication object is enhanced and surface roughness thereof can be maintained on the same level as that of a fabrication object having no fiber filler.

The bead filler preferably has a circularity of from 0.8 to 1.0 and a volume average particle diameter of from 10 to 200 μm. Circularity is obtained according to the following relation, where S represents an area (the number of pixels indicating bead fillers in an image of bead fillers) and L represents a length of the circumference of the area.

$$Circularity = 4\pi S/L^2$$

The volume average particle diameter can be measured by using, for example, a particle size distribution measuring instrument (Microtrac MT3300EXII, manufactured by MicrotracBEL Corp.).

The proportion of the fiber filler preferably accounts for 5 to 60 percent by mass of the total amount of the resin powder. When the proportion is 5 percent by mass or greater, strength of a fabrication object is enhanced. When the proportion is 60 percent by mass or less, fabrication property is improved.

The proportion of the bead filler preferably accounts for 5 to 60 percent by mass of the total amount of the resin powder. When the proportion is 5 percent by mass or greater, strength of a fabrication object is enhanced. When the proportion is 60 percent by mass or less, fabrication property can be improved.

Flame Retardancy

Examples are, halogen-containing, phosphorus-containing, inorganic hydrated metal compound-containing, nitrogen-containing, and silicone-containing retardants. flame retardants for building, vehicles, or hull outfitting are also suitable for the resin powder. If two or more flame retardants are used in combination, the combination of a halogen-containing retardant and an inorganic hydrated metal compound-containing retardant is preferable to improve flame retardancy.

In addition, resin particles may contain fibrous material such as glass fiber, carbon fiber, or aramid fiber or inorganic toughening agents such as inorganic laminate silicate such as talc, mica, and montmorillonite. In such embodiments, it is possible to strike a balance between enhancement on properties and enhancement on retardancy.

Flame retardancy of resin powder can be evaluated by, for example, JIS K6911 format, JIS L1091 format (ISO 6925 regulation), JIS C3005 format, and pyrogen test (using a cone calorimeter).

The proportion of the flame retardant is preferably from 1 to 50 percent by mass to the total amount of the resin powder and more preferably from 10 to 30 percent by mass to further improve flame retardancy. When the proportion is 1 percent by mass or more, flame retardancy is sufficiently secured. In addition, when the proportion is 50 percent by mass or less, melt-solidification property of resin powder does not easily change and it is possible to prevent deterioration of fabrication accuracy and properties.

Atomization

Pulverization or cutting is suitable to atomize resin. According to the method of pulverizing resin, for example, resin composition having a pellet-like form containing the thermoplastic resin mentioned above is pulverized using a pulverizer followed by classification or filtration to remove particles having particle diameters outside the regulated particle diameters. If pulverizing resin utilizing brittleness thereof, the environment during pulverization is that the temperature is the brittle temperature of the resin or lower, preferably ambient temperature or lower, more preferably 0 degrees C. or below, furthermore preferably −25 degrees C. or lower, and particularly preferably −100 degrees C. or lower. To improve flowability of resin particles, it is preferable to remove particles having diameters of, for example, 80 μm or greater and 25μ or less. Resin powder is preferably dried to a degree not having an adverse impact on fabrication. Therefore, it is suitable to use resin powder dried by a vacuum drier or silica gel for fabrication. According to the cutting method, fibrous resin can be cut.

Crystallinity Control

Crystal size and crystal orientation of crystalline resin in powder resin are controlled to reduce errors in recoating treatment in the fabrication process in a high temperature environment. As the method of controlling crystal size and crystal orientation, for example, there are a method of utilizing external stimulus such as heat treatment, extension treatment, an ultrasonic wave treatment, and an external electric field application treatment, a method of using a crystal nucleating agent, a method of using no external stimulus such as a method of slowly evaporating a solvent to increase crystallinity.

A specific heat treatment is annealing in which resin is heated to the glass transition temperature thereof or higher to increase crystallinity. To further improve crystallinity, it is possible to apply annealing to resin to which a crystal nucleating agent is added. In the annealing treatment, for example, resin is heated and maintained at a temperature 50 degrees higher than the glass transition temperature thereof for three days and thereafter slowly cooled down to room temperature.

The degree of orientation and crystallinity of resin are increased by extension. A specific procedure of extension is that, for example, resin is melted at temperatures 30 degrees C. or more higher than the melting point of the resin using an extruder while being stirred and the melted resin is extended to about one to about ten times to obtain a fibrous form. The maximum extension ratio of resin in the extension is suitably set in accordance with melt viscosity of the resin. The number of the nozzles of an extruder is not particularly limited. As the number increases, the productivity increases. The extended resin is subject to processing such as pulverization and cutting to obtain resin powder.

In the ultrasonic wave treatment, for example, glycerin (reagent grade, manufactured by Tokyo Chemical Industry Co. Ltd.) solvent is added to resin powder in an amount of five times as much as the resin followed by heating to the temperature 20 degrees C. higher than the melting point. Thereafter, ultrasonic wave is applied thereto by an ultrasonic wave generator (ultrasonicator UP200S, manufactured by Hielscher Ultrasonics GmbH) at a frequency of 24 KHz and an amplitude of 60 percent for two hours. Subsequent to the ultrasonic wave treatment, it is preferable to rinse the resin powder with an isopropanol solvent at room temperature followed by vacuum drying.

In the external electric field application, for example, after powder is heated to the glass transition temperature thereof or higher and thereafter an alternative electric field (500 Hz) of 600 V/cm is applied to the resin for one hour, the resin is slowly cooled down.

Form

It is preferable that individual particles of resin powder take significantly cylindrical forms.

The significantly cylindrical (significantly circular) has a ratio of the major axis to the minor axis of from 1 to 10. In this embodiment, the boundary of the range is inclusive. The significantly cylindrical form has no particular limit and includes a true cylindrical form, an elliptic column form, etc. The true cylindrical form is preferable. The circle portion of the significantly cylindrical form may partially chip. In the extension, the form of resin powder depends on the faun of nozzle opening of an extruder. For example, to obtain resin powder having a significantly cylindrical form, the nozzle opening is set to have a significantly cylindrical form. To obtain resin powder having a cuboid form, the nozzle opening is set to have a rectangle or square form.

The size of the circle of each plane facing each other in the significantly cylindrical form is not necessarily the same. However, bulk density can be increased if the size is uniform. Therefore, the diameter ratio (large plane/small plane) of the circle of the large plane to the small plane is preferably 1.5 times or less and more preferably 1.1 times or less.

The diameter of the significantly cylindrical form has no particular limit and can be suitably selected to suit to a particular application. For example, the diameter is preferably from 5 to 200 μm. When the circle portion of the significantly cylindrical form is an ellipse, the diameter means the major axis. The height (distance between both planes) of the significantly cylindrical form has no particular limit and can be suitably selected to suit to a particular application. For example, the height is preferably from 5 to 200 μm.

Figure 1A:
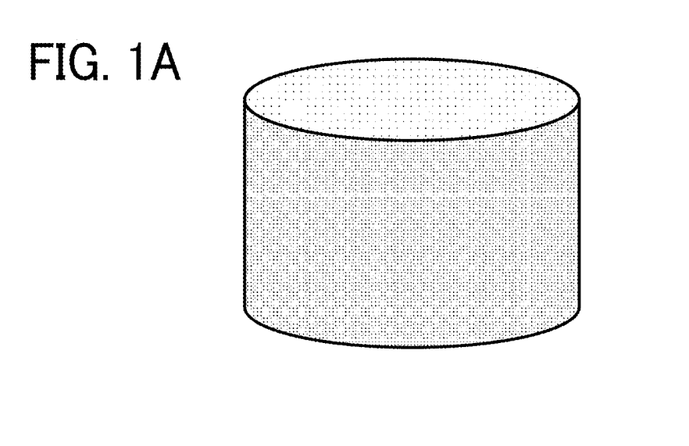
FIG. 1A is a diagram illustrating a schematic perspective view of an example of the resin powder having a significantly cylindrical form.
Figure 1B:
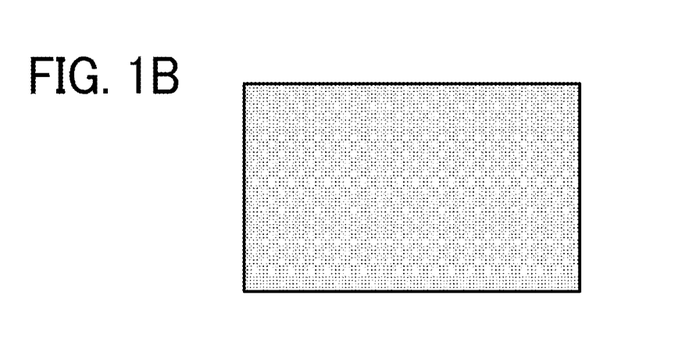
FIG. 1B is a diagram illustrating a schematic side view of the resin particle of the significantly cylindrical form illustrated in FIG. 1A.
Figure 1C:
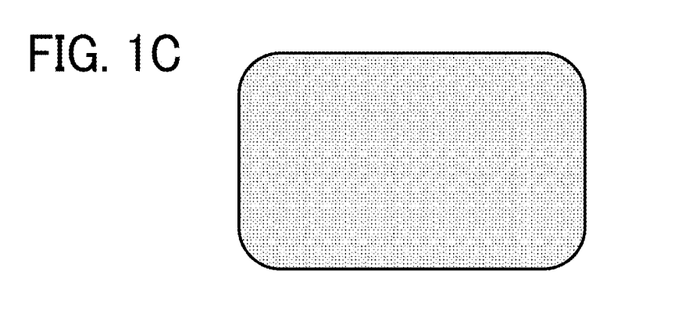
FIG. 1C is a diagram illustrating a schematic side view of an example of a form having no point at end portions in resin powder having a significantly cylindrical form.
Figure 1D:
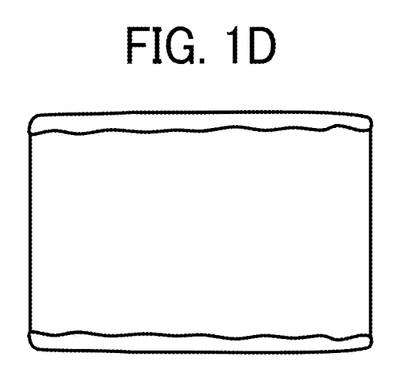
FIG. 1D is a diagram illustrating a schematic side view of another example of a form having no point at end portions in resin powder having a significantly cylindrical form.
Figure 1E:
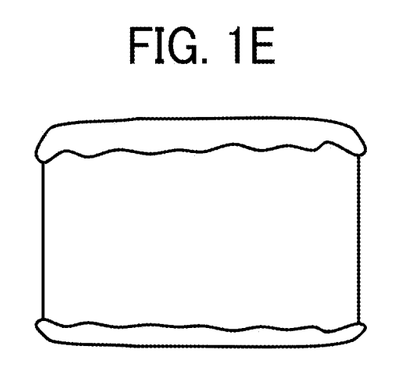
FIG. 1E is a diagram illustrating a schematic side view of another example of a form having no point at end portions in resin powder having a significantly cylindrical form.
Figure 1F:
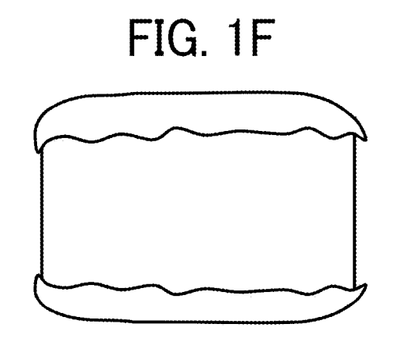
FIG. 1F is a diagram illustrating a schematic side view of another example of a form having no point at end portions in resin powder having a significantly cylindrical form.
Figure 1G:
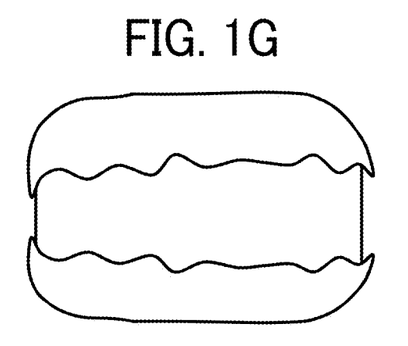
FIG. 1G is a diagram illustrating a schematic side view of another example of a form having no point at end portions in resin powder having a significantly cylindrical form.
Figure 1H:
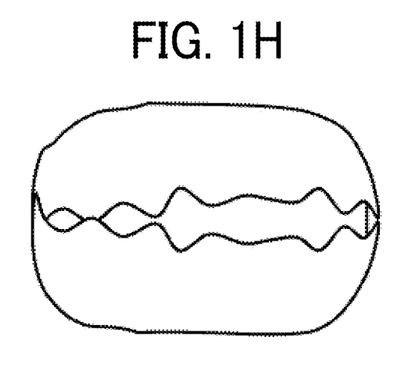
FIG. 1H is a diagram illustrating a schematic side view of another example of a form having no point at end portions in resin powder having a significantly cylindrical form.
Figure 1I:
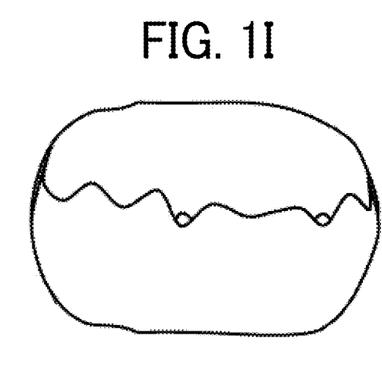
FIG. 1I is a diagram illustrating a schematic side view of another example of a form having no point at end portions in resin powder having a significantly cylindrical form.

The resin powder having a significantly cylindrical form has a base and an upper surface. Preferable forms have no points at ends in terms of increasing bulk density. The point means an angle portion existing in the pillar-like form. The form of the cylindrical particle is described with reference to FIGS. 1A to 1I. FIG. 1A is a diagram illustrating a schematic perspective view of an example of resin powder having a significantly cylindrical form. FIG. 1B is a diagram illustrating a schematic side view of the resin powder having a significantly cylindrical form illustrated in FIG. 1A. FIG. 1C is a diagram illustrating a schematic side view of an example of a significantly cylindrical form with no points at ends. FIGS. 1D to 1I are diagrams illustrating schematic side views of other examples of significantly cylindrical forms with no points at ends.

As the cylindrical form illustrated in FIG. 1A is observed from side, the form is rectangular as illustrated in FIG. 1B. It has angled portions, i.e., four points. Examples of forms with no points at ends are illustrated in FIGS. 1C to 1I. Whether a cylindrical form has a point is confirmed by a projected image of the side plane of the cylindrical form particle. For example, the side of a cylindrical form particle is observed by a scanning electron microscope (S4200, manufactured by Hitachi Ltd.), etc. to acquire a two-dimensional image. In this case, the projected image has four sides. When the portion formed of two adjacent sides is defined as an end part, if the end part is formed of only two adjacent straight lines, an angle is formed and the particle has a point. If the end part is arc as illustrated in FIGS. 1C to 1I, no point is formed at the end portion.

Figure 2:
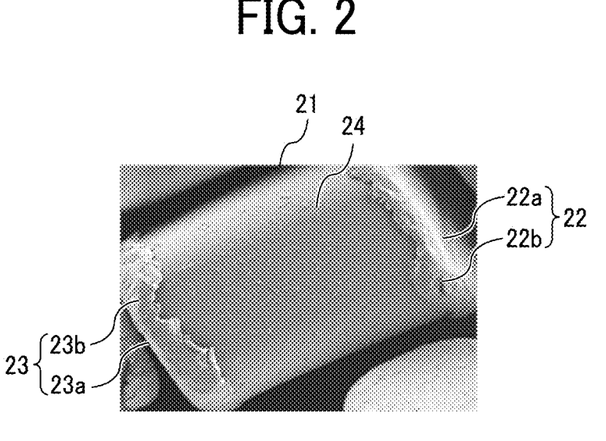
FIG. 2 is a photograph illustrating an example of resin powder having a significantly cylindrical form.

As illustrated in FIG. 2, for example, a cylindrical form 21 includes a first surface 22, a second surface 23, and a side surface 24. The first surface 22 includes a first opposing surface 22a and a perimeter area 22b having a form extending along the side surface 24. The perimeter area 22b of the first surface 22 is a continuous surface with the first opposing surface 22a via a curved surface and significantly orthogonal to the first opposing surface 22a. The second surface 23 includes a second opposing surface 23a facing the first opposing surface 22a and a perimeter area 23b having a form extending along the side surface 24. The perimeter area 23b of the second area 23 is a continuous surface with the second opposing surface 23a via a curved surface and significantly orthogonal to the second opposing surface 23a. The side surface 24 is adjacent to the first surface 22 and the second surface 23. In addition, the perimeter area 22b of the first surface 22 and the perimeter area 23b of the second surface 23 extend on the side surface 24.

The form of the perimeter area 22b of the first surface 22 and the perimeter area 23b of the second surface 23 (both of which are hereinafter also referred to as perimeter area) is at least distinguishable from the side surface 24 in a scanning electron microscope (SEM) image. For example, a form of the perimeter area partially integrated with the side surface 24, a form of the perimeter area adjacent to the side surface 24, a form having a space between the perimeter area and the side surface 24 are allowed. In addition, the perimeter area 22b of the first surface 22 and the perimeter area 23b of the second surface 23 are preferably located along a surface direction significantly identical to the surface direction of the side surface 24.

As illustrated in FIG. 2, the perimeter area 22b of the first surface 22 and the perimeter area 23b of the second surface 23 extend along the side surface 24 and is situated thereon. In addition, the structure of the first surface 22 and the second surface 23 covering around the connection area of the perimeter area 22b of the first surface 22 and the perimeter area 23b of the second surface 23 and the side surface 24 is also referred to as a bottle cap form.

The method of making the form having no point for resin powder of a significantly cylindrical form has no particular limit as long as it can round the points of resin powder. It is suitable to utilize known methods such as mechanical pulverization of high speed rotation, mechanical pulverization of high speed collision, or surface melting by mechanical abrasion using a spheroidizing treatment device.

Properties

The resin preferably has a specific gravity of 0.8 g/mL or greater. When the specific gravity of resin powder is 0.8 g/mL or greater. it is possible to reduce secondary agglomeration of particles in the recoating treatment in which a resin layer is film-formed during fabrication. In terms of replacement of metal to meet the demand for lightweight, specific gravity of resin powder is preferably 3.0 g/mL or less.

Specific gravity is obtained by measuring true specific gravity. True specific gravity is obtained by, for example, obtaining the volume of a sample changing volume and pressure of gas (He gas) at a constant temperature by using a dry-process pycnometer (AccuPyc 1330, manufactured by Shimadzu Corporation) utilizing gas-phase replacement method and measuring the mass of this sample to calculate density.

The 50 percent cumulative volume particle diameter of resin powder is preferably from 5 to 200 μm and more preferably from 5 to 50 μm in terms of dimension stability. The ratio (Mv/Mn) of the volume average particle diameter to the number average particle diameter of powder resin is 2.00 or less, preferably 1.50 or less, more preferably 1.50 or less, and particularly preferably 1.20 or less in terms of fabrication accuracy. The 50 percent cumulative volume particle diameter and Mv/Mn can be measured by, for example, particle size distribution measuring device (microtrac MT3300 EXII, manufactured by MicrotracBEL Corp).

The ratio of the length to the diameter in resin powder has no particular limit and can be suitably selected to suit to a particular application. For example, the ratio is preferably from 0.5 to 2.0 and more preferably from 0.8 to 1.2. Within the preferable range of the ratio, resin powder is advantageous in terms of filling ratio.

A specific example of the method of measuring the ratio of the length to the diameter in resin powder is guiding the ratio from an image taken at a magnifying ratio of, for example, about 100 times Field of Application The resin of the present embodiment has a suitable balance between parameters such as granularity, particle size distribution, heat transfer properties, melt viscosity, bulk density, flowability, melting temperature, and recrystallliization temperature. This resin is suitably used in methods for solid freeform fabrication using resin powder such as SLS, SMS, multi-jet fusion (MJF), and binder jetting (BJ). The resin powder of the present embodiment can be suitably applied to surface modifying agents, spacers, lubricants, paints, grind stone, additives, secondary battery separator, foods, cosmetics, and cloths. In addition, it can be used as material or metal substitution material for use in fields such as auto mobiles, precision devices, semiconductor, aerospace, and medicines.

A fabrication object formed by laser sintering using the resin powder of the present embodiment is smooth and has a surface having a sufficient resolution while reducing occurrence of orange peel. Orange peel means surface deficiency such as coarse planes, voids, or distortion of a fabrication object formed by laser sintering in PBF. Of these surface deficiencies, voids not only degrade aesthetic appearance but also affect mechanical strength.

Resin powder of the present embodiment has excellent long-term recyclability. For fabrication with PBF, MJF, etc. using fresh resin powder and recycled powder of the present embodiment, a fabrication object is obtained free of (a) orange peel property or (b) significant degradation (degradation of tensile strength of 30 percent or more) of mechanical performance ascribable to recycling.

Recycled powder is, for example, what is not used during fabrication for 50 hours by a PBF fabrication device (AM S5500P, manufactured by Ricoh Company Ltd.). Even when fresh powder is added to this recycled powder in an amount of 30 percent by mass and fabrication for 50 hours is further repeated twice, a fabrication object is obtained free of both (a) and (b) mentioned above. (a) and (b) can be evaluated using ISO (International Standardization Organization) 3167 regulation Type 1A 150 mm multi-purpose dog-bone-like test specimen.

Three-Dimensional Fabrication Device

Figure 3:
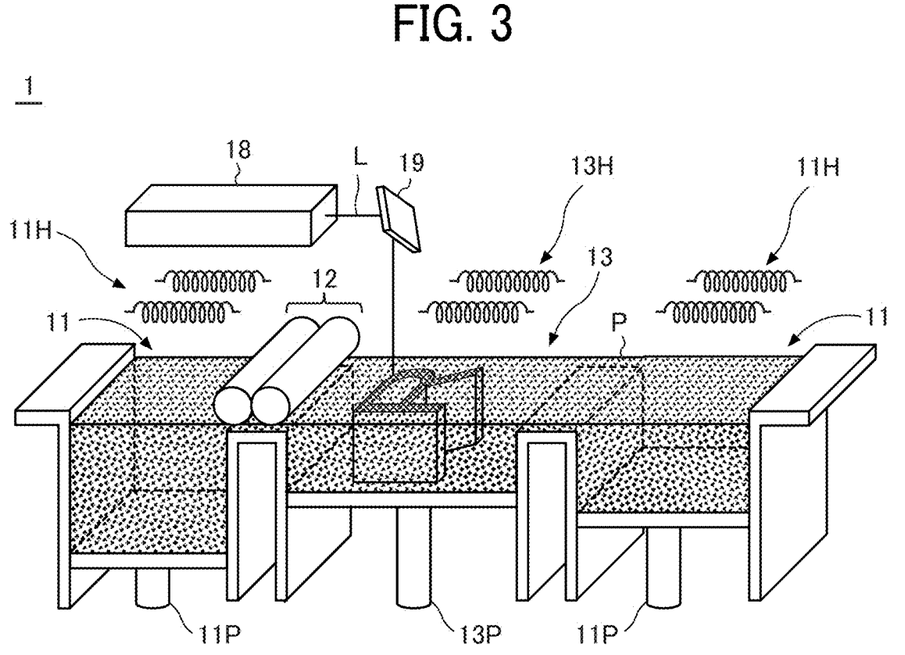
FIG. 3 is a schematic diagram illustrating a solid freeform fabrication device according to an embodiment of the present disclosure.

A solid freeform fabrication device to fabricate an object using the resin powder mentioned above is described with reference to FIG. 3. FIG. 3 is a schematic diagram illustrating the solid freeform fabrication device according to an embodiment of the present disclosure.

As illustrated in FIG. 3, a solid freeform fabrication device 1 includes a supply tank 11 as an example of the accommodating device to accommodate resin powder P for fabrication, a roller 12 to supply the resin powder P accommodated in the supply tank 11, a laser scanning space 13 to scan the resin powder P supplied by the roller 12 with laser L, an electromagnetic ray irradiation source 18 as the irradiation source of the laser L as electromagnetic rays, and a reflection mirror 19 to reflect the laser L emitted from the electromagnetic ray irradiation source 18 to a determined position on the laser scanning space 13. In addition, the solid freeform fabrication device 1 further includes heaters 11H and 13H to respectively heat the resin powder P in the supply tank 11 and the resin powder P accommodated in the laser scanning space 13.

The electromagnetic wave irradiation source 18 has no particular limit. For example, $CO_2$ laser, infrared irradiation sources, microwave generators, radiant heaters, LED lamps, and combinations thereof are suitable.

The reflection surface of the reflection mirror 19 moves based on two-dimensional data of a three-dimensional (3D) model while the electromagnetic wave irradiation source 18 emits the laser L.

The two dimensional data of the 3D model represents each cross section form for a 3D model sliced with a predetermined interval. Therefore, when the reflection angle of the laser L changes, the portion indicated by the two-dimensional data in the laser scanning space 13 is selectively irradiated with the laser L. The resin powder positioned at the irradiation position of the laser L is melted and sintered to form a layer. That is, the electromagnetic irradiation source 18 serves as a layer-forming device to form each layer of a fabrication object from the resin powder P.

In addition, the supply tank 11 and the laser scanning space 13 of the solid freeform fabrication device 1 respectively includes pistons 11P and 13P. The pistons 11P and 13P respectively move the supply tank 11 and the laser scanning space 13 up and down against the lamination direction of a fabrication object at the completion of forming a layer. Due to this, fresh resin powder P for use in fabrication of a new layer can be supplied from the supply tank 11 to the laser scanning space 13.

The solid freeform fabrication device 1 changes the irradiation position of the laser by the reflection mirror 19 to selectively melt the resin powder P. The present disclosure does not limit thereto. The resin powder of the present disclosure can be suitably used in a fabrication device employing selective mask sintering (SMS) method. In the SMS method, for example, resin powder is partially masked by a shielding mask and the unmasked portion is irradiated with electromagnetic rays such as infrared rays so that the resin powder is selectively melted for fabrication. In the case of using SMS process, the powder resin P preferably contains at least one of a heat absorbent, dark material, etc. to reinforce infrared absorbability. Examples of the heat absorbent or the dark material are carbon fiber, carbon black, carbon nano tube, and cellulose nano fiber. The SMS process suitably usable is described in, for example, the specification of U.S. Pat. No. 6,531,086.

Method of Manufacturing Solid Freeform Fabrication Object

FIGS. 4A, 4B, 5A, and 5B are conceptual diagrams illustrating a method of fabricating a solid freeform fabrication object. The method of manufacturing a solid freeform fabrication object using the solid freeform fabrication device 1 is described with reference to FIGS. 4A, 4B, 5A, and 5B.

Figure 4A:
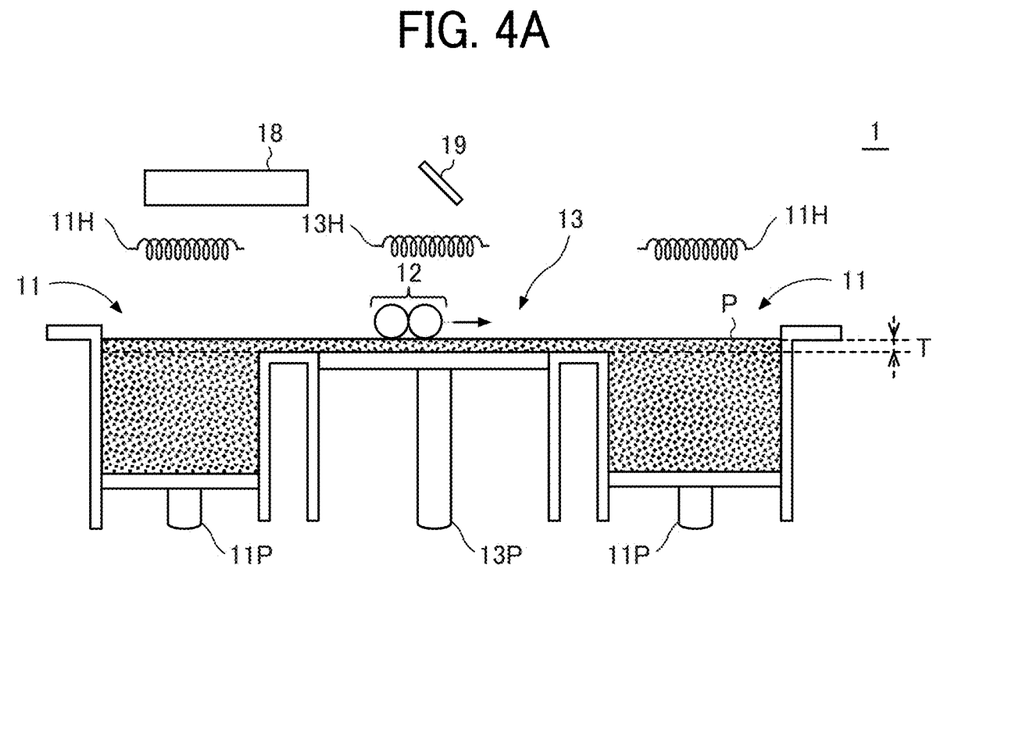
FIGS. 4A and 4B are conceptual diagrams illustrating an example of the method of fabricating a solid freeform fabrication object.

The resin powder P accommodated in the supply tank 11 is heated by the heater 11H. The temperature of the supply tank 11 is preferably as high as possible but not higher than the melting point of the resin particle P to reduce warp which occurs during melting ascribable to laser irradiation. However, to prevent melting of the resin powder P in the supply tank 11, the temperature is at least 10 degrees C. lower than the melting point of the resin powder P. As illustrated in FIG. 4A, as one example of the supply process, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer. The resin powder P supplied to the laser scanning space 13 is heated by the heater 13H. The temperature of the laser scanning space 13 is preferably as high as possible in order to reduce warp occurring during melting ascribable to laser irradiation but at least 5 degrees C. lower than the melting point of the resin particle P at the laser scanning space 13 to prevent melting of the resin powder P there.

Figure 4B:
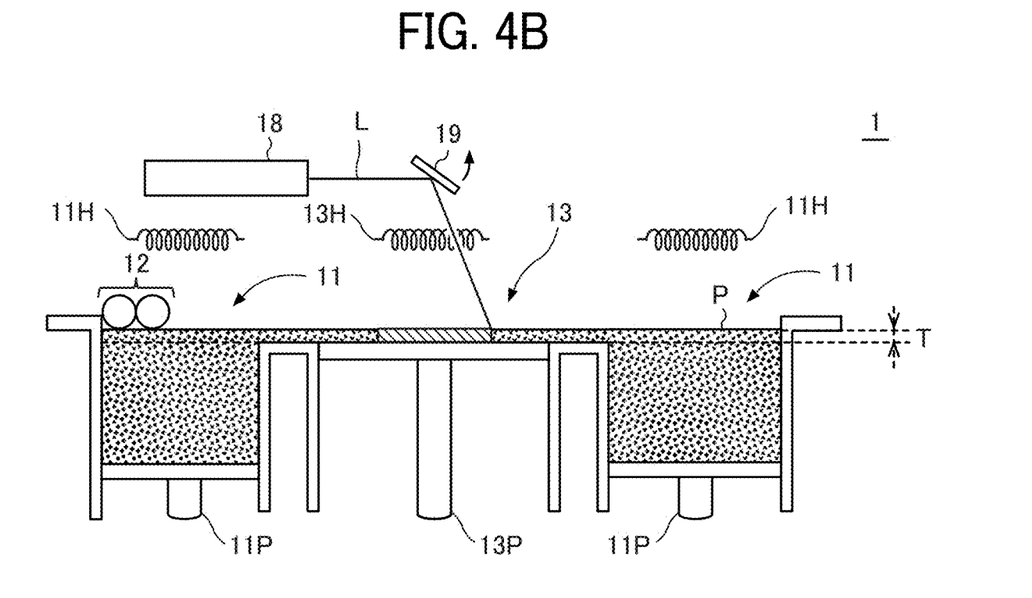

The engine of the solid freeform fabrication device 1 receives input of multiple two-dimensional data created from the 3D model. As illustrated in FIG. 4B, the engine of the solid freeform fabrication device 1 causes the electromagnetic ray irradiation source 18 to emit laser beams while moving the reflection surface of the reflection mirror 19 based on the two dimensional data for the part closest to the base of a fabrication object. The power of the laser has no particular limit and can be suitably selected to suit to a particular application. For example, it is preferably from 10 to 150 W. Due to the irradiation of the laser, of the powder layers, the resin powder P positioned corresponding to the pixel indicated by the two dimensional data for the part closest to the base of a fabrication object is melted. At the completion of the laser irradiation, the melted resin cures and a sintered layer having a form corresponding to the two dimensional data for the part closest to the base of a fabrication object is formed (an example of the layer forming process).

The thickness T of the sintered layer has no particular limit. For example, it is preferably 10 μm or greater, more preferably 50 μm or greater, and furthermore preferably 100 μm or greater. The thickness T of the sintered layer has no particular limit. For example, as the average, it is preferably less than 200 μm, more preferably less than 150 μm, and furthermore preferably less than 120 μm.

Figure 5A:
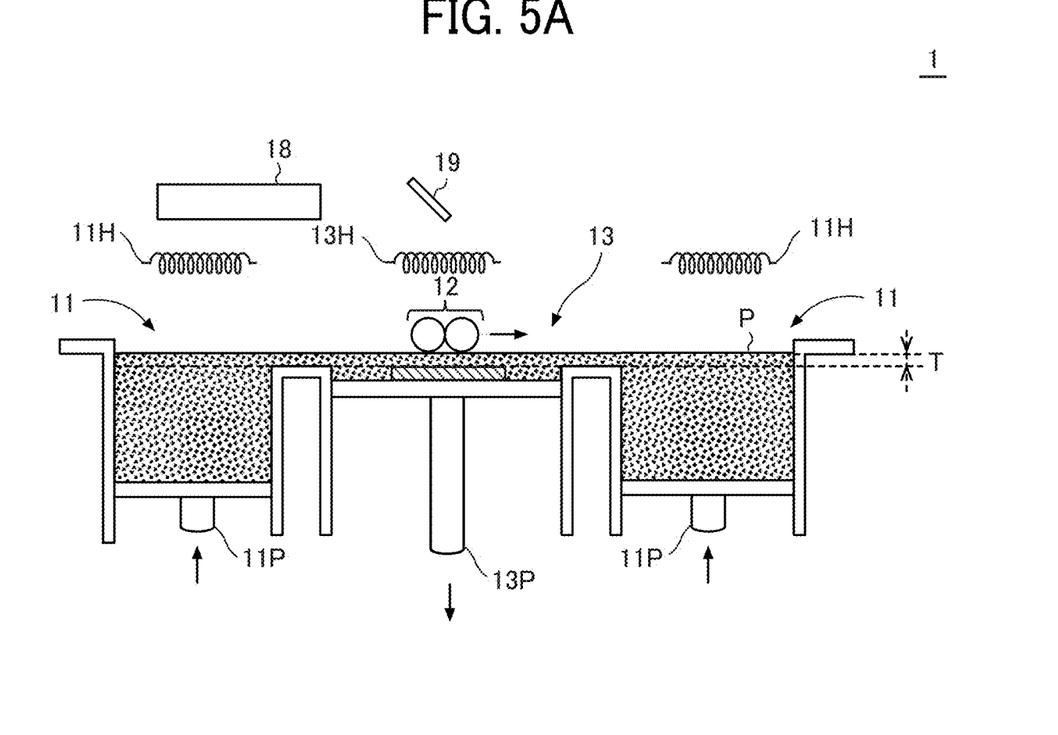
FIGS. 5A and 5B are conceptual diagrams illustrating an example of the method of fabricating a solid freeform fabrication object.

As illustrated in FIG. 5A, at the forming of the sintered layer closest to the base, the engine of the solid freeform fabrication device 1 lowers the laser scanning space 13 in an amount corresponding to the thickness T corresponding to the thickness of a single layer by the piston 13P to form a fabrication space having a thickness T on the laser scanning space 13. In addition, the engine of the solid freeform fabrication device 1 elevates the piston 11P to supply fresh resin powder P. Thereafter, as illustrated in FIG. 5A, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer.

Figure 5B:
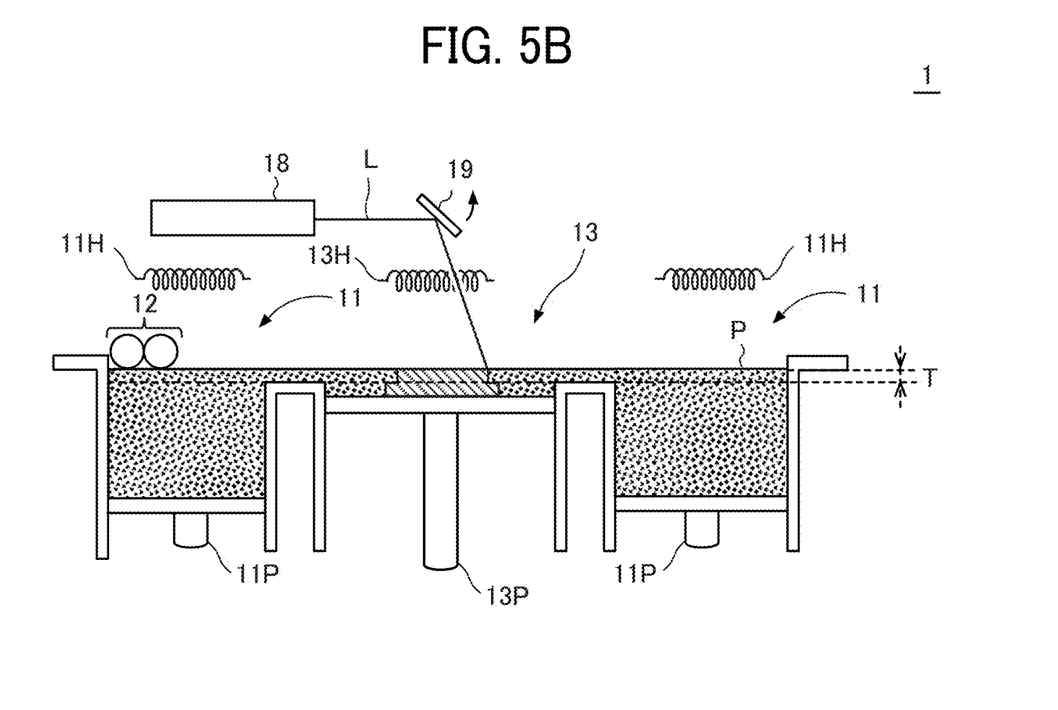

As illustrated in FIG. 5B, the engine of the solid freeform fabrication device 1 causes the electromagnetic ray irradiation source 18 to emit laser beams while moving the reflection surface of the reflection mirror 19 based on the two dimensional data for the part second closest to the base of all of the multiple two-dimensional data. Due to the irradiation of the laser, of the powder layers, the resin powder P positioned corresponding to the pixel indicated by the two dimensional data for the part second closest to the base is melted. At the completion of the laser irradiation, the melted resin cures and the sintered layer having a form of the two-dimensional data of the second closest to the base is laminated on the sintered layer closest to the base.

The solid freeform fabrication device 1 repeats the supplying process and the layer forming process to laminate sintered layers. At the completion of fabrication based on all of the multiple two-dimensional data, a fabrication object having the same form as the 3D model is obtained.

Fabrication (Three-Dimensional) Object

The fabrication object fabricated using the resin powder mentioned above has no particular limit. For example, the fabrication object can be low volume production of electronic gear parts, prototypes of automobile parts, prototypes for strength test, aerospace, dress-up tools of automobile industry. In comparison with other methods such as fused filament fabrication (FFF) methods or inkjet methods, PBF methods are expected to manufacture products having superior strength, which can be practically used as a real product. The production speed is not on par with mass production such as injection molding, etc. However, for example, it is possible to obtain required amount of production by manufacturing a massive amount of small parts in a two-dimensional manner. In addition, the method of manufacturing a solid freeform fabrication object by PBF method for use in the present disclosure obviates the need for dies required in injection molding. Therefore, overwhelming cost reduction and short delivery time can be achieved for prototype manufacturing.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Example 1

0.2 parts of a phenol-based antioxidant (AO-330, 1,3,5-tris(3,5-di-tert-butyl-4-hydroxyphenylmethyl)-2,4,6-trimethylebenzene, manufactured by ADEKA CORPORATION) was added to 99.8 parts of polybutylene terephthalate (PBT) resin (NOVADURAN® 5020, melting point of 218 degrees C., manufactured by Mitsubishi Engineering-Plastics Corporation). The mixture was reeled at an extension ratio of 3 times or more to form a fiber having a diameter of 60 μm using a single shaft extruder (D2020, manufactured by TOYO SEIKI KOGYO CO. LTD.). Thereafter, using a cutting device (NZI0606, manufactured by OGINO SEIKI CO., LTD.), the resin fiber was cut to have a width of from 60 to 70 μm to obtain resin powder. The 50 percent cumulative volume particle diameter (D50) of the thus-obtained resin powder is 65 μm. The form was checked with a scanning electron microscope (JSM-7800 FPRIME, manufactured by JEOL Ltd.). The line diameter was 60 μm and the diameter was 60 μm. To melt the surface by mechanical abrasion, Q mixer (manufactured by NIPPON COKE & ENGINEERING CO., LTD.) was used to subject the obtained resin powder to treatment at the number of rotation of 1,000 rotation per minute (rpm) for 20 minutes to obtain particles having significantly cylindrical form. This was determined as the resin powder of Example 1.

Example 2

Resin powder of Example 2 was obtained in the same manner as in Example 1 except that the polybutylene terephthalate (PBT) resin used in Example 1 was changed to polyamide 66 (PA66) resin (Leona™ 1300S, melting point of 265 degrees C., manufactured by Asahi Kasei Chemicals Corporation), and 1.0 part of a phosphite-based antioxidant (PEP-36, 3,9-Bis(2,6-di-tert-butyl-4-methylphenoxy)-2,4,8,10-tetraoxa-3,9-diphosphaspiro[5,5]undecane, manufactured by ADEKA CORPORATION) and 0.1 parts of copper acetate as a polymerization inhibitor were added.

Example 3

Resin powder of Example 3 was obtained in the same manner as in Example 2 except that polyamide 66 (PA66) resin was changed to polyamide 9T (PA9T) resin (Genestar™ N1000A, melting point of 306 degrees C., manufactured by KURARAY CO., LTD.).

Example 4

Resin powder of Example 4 was obtained in the same manner as in Example 1 except that polybutylene terephthalate (PBT) resin was changed to polypropylene (PP) resin (NOVATEC™ MA3, melting point of 130 degrees C., glass transition temperature of 0 degrees C., manufactured by JAPAN POLYPROPYLENE CORPORATION).

Example 5

Resin powder of Example 5 was obtained in the same manner as in Example 1 except that the polybutylene terephthalate (PBT) resin was changed to polyetherether ketone (PEEK) resin (HT P22PF, melting point of 343 degrees C., glass transition temperature of 143 degrees C., manufactured by VICTREX).

Example 6

Resin powder of Example 6 was obtained in the same manner as in Example 1 except that the polybutylene terephthalate (PBT) resin was changed to polyacetal (POM) resin (TENAC™ 4060, melting point of 175 degrees C., manufactured by Asahi Kasei Chemicals Corporation).

Example 7

Resin powder of Example 7 was obtained in the same manner as in Example 1 except that the phenol-based antioxidant (AO-330, manufactured by ADEKA CORPORATION) was changed to 0.5 parts of a phenol-based antioxidant (AO-80, 3,9-Bis(2-[3-(3-tert-butyl-4-hydroxy-5-methylphenyl)propionyloxy]-1,1-dimethylethyl}}-2,4,8,10-tetraoxaspiro[5,5]undecane, manufactured by ADEKA CORPORATION) and 1.0 part of a phosphite-based antioxidant (PEP-36, 3,9-Bis(2,6-di-tert-butyl-4-methylphenoxy)-2,4,8,10-tetraoxa-3,9-diphosphaspiro[5,5]undecane, manufactured by ADEKA CORPORATION) was added.

Example 8

Resin powder of Example 8 was obtained in the same manner as in Example 6 except that 0.25 parts of a sulfur-containing antioxidant (AO-412S, 2,2-Bis{[3-(dodecylthio)-1-oxopropoxy]methyl]propane-1,3-diyl bis[3(dodecylthio)propionate], manufactured by ADEKA CORPORATION) and 0.25 parts of a phosphate-based antioxidant (metal chelate agent, [A3], AX-71, octadecyl phosphate, manufactured by ADEKA CORPORATION) were further added.

Comparative Example 1

1 part of calcium stearate (manufactured by Taihei Chemical Industrial Co., Ltd.) was added to 99 parts of polybutylene terephthalate (PBT) resin (NOVADURAN® 5020, melting point of 218 degrees C., manufactured by Mitsubishi Engineering-Plastics Corporation) to prepare mix-kneaded pellet using a single shaft extruder (D2020, manufactured by TOYO SEIKI KOGYO CO. LTD.). MFR of the mix-kneaded pellet was 10 g/10 min. Thereafter, using a low temperature pulverization system (LINREX MILL LX1, manufactured by Hosokawa Micron Corporation), the mix-kneaded pellet was subject to frost shattering at −200 degrees C. to have a width of from 5 to 200 μm to obtain resin powder of Comparative Example 1.

Comparative Example 2

Polybutylene terephthalate (PBT) resin (NOVADURAN® 5020, melting point of 218 degrees C., manufactured by Mitsubishi Engineering-Plastics Corporation)

was heated at 210 degrees C. for four hours under a pressure of 0.1 kPa and taken out and sufficiently cooled down. MFR was 0.1 g/10 min. Thereafter, using a low temperature pulverization system (LINREX MILL LX1, manufactured by Hosokawa Micron Corporation), the resultant was subject to frost shattering at −200 degrees C. to have a width of from 5 to 200 μm to obtain resin powder of Comparative Example 2.

Comparative Example 3

A resin powder of Comparative Example 3 was obtained in the same manner as in Comparative Example 2 except that polybutylene terephthalate (PBT) resin was changed to polyamide 66 (PA66) resin (Leona™ 1300S, melting point of 265 degrees C., manufactured by Asahi Kasei Chemicals Corporation) and the heating temperature was changed to 255 degrees C.

Comparative Example 4

A resin powder of Comparative Example 4 was obtained in the same manner as in Comparative Example 1 except that polybutylene terephthalate (PBT) resin was changed to polyamide 9T (PA9T) resin (Genestar™ N1000A, melting point of 300 degrees C., manufactured by KURARAY CO., LTD.). 50 percent cumulative volume particle diameter of the resin powder of Comparative Example 4 was 42 μm.

Comparative Example 5

Resin powder of Comparative Example 5 was obtained in the same manner as in Comparative Example 1 except that polybutylene terephthalate (PBT) resin was changed to polypropylene (PP) resin (NOVATE™ MA3, melting point of 180 degrees C., glass transition temperature of 0 degrees C., manufactured by JAPAN POLYPROPYLENE CORPORATION).

Comparative Example 6

Resin powder of Comparative Example 6 was obtained in the same manner as in Comparative Example 1 or 2? except that the polybutylene terephthalate (PBT) resin was changed to a polyetherether ketone (PEEK) resin (HT P22PF, melting point of 334 degrees C., manufactured by VICTREX) and the heating temperature was changed to 330 degrees C.

Comparative Example 7

Resin powder of Comparative Example 7 was obtained in the same manner as in Comparative Example 2 except that the polybutylene terephthalate (PBT) resin was changed to polyacetal (POM) resin (TENAC™ 4060, melting point of 175 degrees C., manufactured by Asahi Kasei Chemicals Corporation) and the heating temperature was changed to 165 degrees C.

Melting point, 50 percent cumulative volume particle diameter, volume average particle diameter (Mv), number average particle diameter (Mn), specific gravity, and MFR of the resin powder obtained in Examples and Comparative Examples were measured. The results are shown in Table 1.

Melting Point

The melting points of the resin particles of each Example and Comparative Example were measured according to ISO 3146 regulation.

50 Percent Cumulative Volume Particle Diameter, Volume Average Particle Diameter (Mv), and Number Average Particle Diameter (Mn)

The 50 percent cumulative volume particle diameter, the volume average particle diameter, and the number average particle diameter were measured by using a particle size distribution measuring instrument (Microtrac MT3300EXII, manufactured by MicrotracBEL Corp.) employing a drying process (atmosphere) method without using a solvent, utilizing particle refractive index per resin powder. The particle refractive index was set as follows: polybutylene terephthalate (PBT) resin of 1.57, polyamide 66 (PA66) resin of 1.53, polyamide 9T (PA9T) resin of 1.53, polypropylene (PP) resin of 1.48, polyether ether ketone (PEEK) resin of 1.57, and polyacetal (POM) resin of 1.48. The ratio (Mv/Mn) of the volume average particle diameter to the number average particle diameter was calculated from the obtained volume average particle diameter and the obtained number average particle diameter.

Specific Gravity

Using a dry-process pycnometer (AccuPyc 1330, manufactured by Shimadzu Corporation) according to gas-phase replacement method, volume and pressure of gas (He gas) were changed at a constant temperature to obtain the volume of a sample and thereafter measure the mass thereof. Density of the sample was obtained by dividing the mass by the volume.

Melt Mass-Flow Rate (MFR)

MFR was measured under a load of 2.16 kg using a melt mass-flow rate measuring device (Type D405913, manufactured by Dynisco, LLC.) according to JIS K7210 format (ISO 1133 regulation). The measuring temperature was 15 degrees C. higher than the melting point shown in Table 1. After filling with the resin powder, the resin was heated for two minutes or longer to sufficiently melt the resin and thereafter subject to measuring.

Orange peel property, long-term recyclability (retention rate percent) and tension strength of the resin powder obtained in each Example and Comparative Example were evaluated in the following manner. The results are shown in Table 2.

Orange Peel Property

A solid freeform fabrication object was manufactured by an SLS fabrication device (AM 55500P, manufactured by Ricoh Company, Ltd.) using the resin powder of each Example and Comparative Example. The setting conditions were: average layer thickness of 0.1 mm, a laser output of from 10 to 150 W, a laser scanning space of 0.1 mm, and a part bed temperature of −3 degrees C. below the melting point. ISO (International Standardization Organization) regulation 3167 Type 1A 150 mm length multi-purpose dog-bone-like test specimen (length of 80 mm, thickness of 4 mm, center portion with a width of 10 mm) was manufactured based on data such as CAD of a cuboid freeform fabrication (sample for dimension) (mm) having a side of 5 cm and an average thickness of 0.5 cm. The surface of the thus-obtained solid freeform fabrication object was observed to evaluate orange peel property based on the following evaluation criteria.

Evaluation Criteria

A: No surface defects such as coarse surface, voids, or warp occur

B: Surface defects such as coarse surface, voids, or warp occur

Tensile Strength

Long-term recyclability of the resin powder in the SLS process was measure in the following manner. 10 kg of powder was added to the supply bed of an SLS fabrication device (AM S5500P, manufactured by Ricoh Company, Ltd.). The setting conditions of the SLS fabrication device were the same as those for the evaluation on orange peel property. Using the resin powder of Examples and Comparative Examples, five tensile strength test specimens were fabricated at the center part of the laser scanning space 13 in the SLS fabrication device with long sides disposed along the Y axis direction (parallel with the rotation axis of the roller 12 illustrated in FIG. 3). The gap between each fabrication layer was 5 mm. The tensile strength test specimen was an ISO (International Standardization Organization) 3167 regulation Type 1A 150 mm length multi-purpose dog-bone-like test specimen (specimen having a center portion of a length of 80 mm, a thickness of 4 mm, and a width of 10 mm). In this treatment, 20 fabrication layers were first laminated to fabricate the tensile strength test specimen. In addition, any arbitrary sample was further fabricated to take 50 hours for fabrication. The thus-obtained tensile strength test specimen for a freeform fabrication object was subject to the tensile strength test according to ISO 527 regulation by a tensile strength tester (AGS-5kN, manufactured by Shimadzu Corporation) to measure tensile strength. The test speed in the tensile strength test was constant at 50 mm/minute. The initial value of tensile strength in Table 2 is the average of measuring values in the test for the tensile strength test specimen five times. The initial value of the tensile strength is the result of the tensile strength test for a fabrication object using fresh powder (never used for fabrication).

Long-Term Recyclability

The resin powder of each Example and Comparative Example was maintained at the temperature 15 degrees C. lower than the melting point thereof under a pressure of 0.1 kPa for four hours. Using the resin powder before and after this temperature maintenance, melt mass-flow rate (g/10 min) was measured at the temperature higher than the melting point of the resin powder under a load of 2.16 kg according to JIS K7210 format. Melt mass-flow rate before the temperature maintenance is shown in Table 1. The ratio obtained by dividing the melt mass-flow rate after the heating (temperature maintenance) by the melt mass-flow rate before the heating (temperature maintenance) was evaluated based on the following evaluation criteria. The ratio obtained by dividing the melt mass-flow rate after the temperature maintenance by the melt mass-flow rate before the temperature maintenance is shown in Table 2.

Evaluation Criteria

A: Ratio of greater than 0.80 to 1.20
B: Ratio of not greater than 0.80 or greater than 1.20

TABLE 1

| | | | Resin powder for solid freeform fabrication | | | | |
|---|---|---|---|---|---|---|---|
| | Particle Resin | Melting point (degrees C.) | 50 percent cumulative volume particle diameter (μm) | Specific gravity (g/ml) | Mv/Mn | MFR (A) (g/10 min) before heating | MFR (A) (g/10 min) after heating |
| Comparative Example 1 | PBT | 217 | 65 | 1.32 | 1.49 | 10 | 6 |
| Comparative Example 2 | PBT | | 65 | | | 0.1 | 0.001 |
| Example 1 | PBT | | 65 | | | 12 | 11.4 |
| Example 7 | PBT | | 65 | | | 10 | 9.7 |
| Comparative Example 3 | PA66 | 265 | 50 | 1.07 | 1.59 | 0.1 | 0.04 |
| Example 2 | PA66 | | 51 | | | 7 | 6.5 |
| Comparative Example 4 | PA9T | 306 | 42 | 1.37 | 1.80 | 52 | 26 |
| Example 3 | PA9T | | 41 | | | 10 | 9.3 |
| Comparative Example 5 | PP | 130 | 32 | 0.91 | 1.39 | 55 | 68.8 |
| Example 4 | PP | | 32 | | | 22 | 55.5 |
| Comparative Example 6 | PEEK | 334 | 10 | 1.30 | 1.60 | 0.1 | 0.05 |
| Example 5 | PEEK | | 10 | | | 2 | 1.8 |
| Comparative Example 7 | POM | 175 | 21 | 1.41 | 1.90 | 0.1 | 0.06 |
| Example 6 | POM | | 21 | | | 10 | 9.5 |
| Example 8 | POM | | 21 | | | 10 | 9.7 |

TABLE 2

| | Orange peel property | Long-term recyclability (ratio) | Tensile strength (initial value) (MPa) |
|---|---|---|---|
| Comparative Example 1 | B | B (0.60) | 30 |
| Comparative Example 2 | B | B (0.10) | 20 |
| Example 1 | A | A (0.95) | 57 |
| Example 7 | A | A (0.97) | 58 |
| Comparative Example 3 | B | B (0.40) | 50 |
| Example 2 | A | A (0.93) | 83 |
| Comparative Example 4 | B | B (0.50) | 120 |
| Example 3 | A | A (0.93) | 165 |
| Comparative Example 5 | B | B (0.80) | 30 |
| Example 4 | A | A (0.99) | 41 |
| Comparative Example 6 | B | B (0.50) | 93 |
| Example 5 | A | A (0.92) | 240 |
| Comparative Example 7 | B | B (0.60) | 55 |
| Example 6 | A | A (0.95) | 70 |
| Example 8 | A | A (0.97) | 71 |

According to the present disclosure, recycled resin powder for solid freeform fabrication is provided which can reduce occurrence of surface deficiency or deterioration of tensile strength of an object fabricated using the recycled resin powder.

Having now fully described embodiments of the present invention, it will be apparent to one of ordinary skill in the art that many changes and modifications can be made thereto without departing from the spirit and scope of embodiments of the invention as set forth herein.

What is claimed is:

1. A resin powder suitable for solid freeform fabrication, the powder comprising:
    a polyarylketone comprising polyether ether ketone, polyether ketone, and/or polyether ketone ketone,
    wherein the powder has a melting point of 100° C. or higher as measured according to ISO 3146 regulation and a ratio of melt mass-flow rate B to melt mass-flow rate A of greater than 0.80 to 1.20,
    wherein the melt mass-flow rate A and the melt mass-flow rate B are respectively measured at 15° C. higher than the melting point under a load of 2.16 kg according to JIS K7210 format before and after the resin powder is maintained at a temperature 15° C. lower than the melting point under a pressure of 0.1 kPa for four hours.

2. The powder of claim 1, further comprising:
    an anti-degradation agent.

3. The powder of claim 1, further comprising:
    a first anti-degradation agent; and
    a second anti-degradation agent.

4. The powder of claim 3, wherein each of the first and second anti-degradation agent has a proportion of from 0.05 to 5 percent by mass of a total mass of the powder.

5. The powder of claim 2, wherein the anti-degradation agent comprises a metal chelate material, an ultraviolet absorber, a polymerization inhibitor, and/or an antioxidant.

6. The powder of claim 2, further comprising:
    a hindered phenol-based compound;
    a phosphorus-containing compound;
    a sulfur-containing compound; and/or
    copper acetate.

7. The powder of claim 1, having an Mv/Mn ratio of 2.00 or less,
    wherein Mv is a volume average particle diameter and Mn is a number average particle diameter.

8. The powder of claim 1, having a specific gravity of 0.8 g/mL or greater.

9. A rein powder, comprising:
    a polyolefin, polyarylketone, polyphenylene sulfide, liquid crystal polymer, polyacetal, polyimide, and/or fluorochemical resin;
    a hindered phenol-based compound, a phosphorus-containing compound, a sulfur-containing compound, and/or copper acetate,
    wherein the powder has an Mv/Mn ratio of 2.00 or less, My being a volume average particle diameter and Mn being a number average particle diameter,
    wherein the powder has a melting point of 100° C. or higher as measured according to ISO 3146 regulation and a ratio of melt mass-flow rate B to melt mass-flow rate A of greater than 0.80 to 1.20, and
    wherein the melt mass-flow rate A and the melt mass-flow rate B are respectively measured at 15° C. higher than the melting point under a load of 2.16 kg according to JIS K7210 format before and after the resin powder is maintained at a temperature 15° C. lower than the melting point under a pressure of 0.1 kPa for four hours.

10. The powder of claim 1, further comprising:
    a polyolefin, polyamide, polyester, polyphenylene sulfide, liquid crystal polymers, polyacetal, polyimide, and/or fluorochemical resin.

11. The powder of claim 10, wherein the polyamide is present and comprises polyamide 410, polyamide 4T, polyamide 6, polyamide 66, polyamide MXD6, polyamide 610, polyamide 6T, polyamide 11, polyamide 12, polyamide 9T, polyamide 10T, and/or aramid.

12. The powder of claim 10, wherein the polyester is present and comprises polyethylene terephthalate, polybutylene terephthalate, and/or polylactate.

13. A device configured for fabricating a solid freeform fabrication object, the device comprising:
    an accommodating device configured to accommodate the resin powder of claim 1;
    a supplying device configured to supply the resin powder; and
    a layer-forming device configured to melt the resin powder supplied by the supplying device in a selected area to form a layer,
    wherein the supplying device repeats supplying the resin powder and the layer forming device repeats forming the layer to laminate the layer to form a solid freeform fabrication object.

14. The powder of claim 9, having a 50 percent cumulative volume particle diameter in a range of from 5 to 200 µm.

15. The powder of claim 9, wherein the polyarylketone is present and comprises polyether ether ketone, polyether ketone, and/or polyether ketone ketone.

16. The powder of claim 1, further comprising copper acetate.

17. The powder of claim 9, comprising the copper acetate.

18. The powder of claim 1, further comprising a polymerization inhibitor.

19. The powder of claim 9, comprising the polyolefin.

20. The powder of claim 9, comprising the polyphenylene sulfide, liquid crystal polymer, polyacetal, polyimide, and/or fluorochemical resin.

* * * * *